(12) United States Patent
Chapman

(10) Patent No.: US 7,584,279 B1
(45) Date of Patent: Sep. 1, 2009

(54) SYSTEM AND METHOD FOR MAPPING BLOCK-BASED FILE OPERATIONS TO FILE LEVEL PROTOCOLS

(75) Inventor: Dennis E. Chapman, Ben Lomond, CA (US)

(73) Assignee: NetApp, Inc., Sunnyvale, CA (US)

( * ) Notice: Subject to any disclaimer, the term of this patent is extended or adjusted under 35 U.S.C. 154(b) by 839 days.

(21) Appl. No.: 10/188,250

(22) Filed: Jul. 2, 2002

(51) Int. Cl.
*G06F 15/173* (2006.01)

(52) U.S. Cl. .................... 709/226; 709/230; 710/11; 710/74

(58) Field of Classification Search ............... 711/100, 711/112, 200, 202, 212; 709/223, 226, 230; 710/11, 74
See application file for complete search history.

(56) References Cited

U.S. PATENT DOCUMENTS

| | | | |
|---|---|---|---|
| 5,163,131 A | | 11/1992 | Row et al. |
| 5,355,453 A | | 10/1994 | Row et al. |
| 5,485,579 A | | 1/1996 | Hitz et al. |
| 5,802,366 A | | 9/1998 | Row et al. |
| 5,931,918 A | | 8/1999 | Row et al. |
| 5,941,972 A | | 8/1999 | Hoese et al. |
| 6,009,502 A | * | 12/1999 | Boeuf ........................ 711/170 |
| 6,065,037 A | | 5/2000 | Hitz et al. |
| 6,370,614 B1 | * | 4/2002 | Teoman et al. .............. 711/113 |
| 6,425,035 B2 | | 7/2002 | Hoese et al. |
| 6,463,509 B1 | * | 10/2002 | Teoman et al. .............. 711/137 |
| 6,779,063 B2 | * | 8/2004 | Yamamoto ................... 710/74 |
| 6,826,615 B2 | * | 11/2004 | Barrall et al. ............... 709/227 |
| 7,027,439 B1 | * | 4/2006 | Barrow et al. ............... 370/389 |
| 2002/0078299 A1 | * | 6/2002 | Chiou et al. ................. 711/119 |
| 2002/0112022 A1 | | 8/2002 | Kazar et al. |
| 2002/0116593 A1 | | 8/2002 | Kazar et al. |
| 2004/0002934 A1 | * | 1/2004 | Taulbee et al. ................. 707/1 |
| 2005/0027798 A1 | * | 2/2005 | Chiou et al. ................ 709/203 |
| 2005/0050110 A1 | * | 3/2005 | Sawdon et al. ............. 707/201 |

OTHER PUBLICATIONS

DAPS: Direct Access File System Protocol, Version, 1.0, by Network Appliance, Inc, Sep. 1, 2001.
Common Internet File System (CIFS) Version : CIFS-Spec 0.9, Storage Networking Industry Association (SNIA), Draft SNIA CIFS Documentation Work Group Work-in-Progress, Revision Date: Mar. 26, 2001.
SCSI-3 Block Commands, NCITS 306-199X, by the American National Standards Institute, Inc., Nov. 13, 1997.

* cited by examiner

*Primary Examiner*—Nathan J Flynn
*Assistant Examiner*—Mohamed Wasel
(74) *Attorney, Agent, or Firm*—Cesari and McKenna, LLP

(57) ABSTRACT

A system and method for mapping block-based file operations to file-level protocols is provided. The system and method enable applications on a networked computer designed to exclusively access only locally-attached storage to also access networked data storage. The mapping occurs transparently to higher levels of operating systems or applications so that applications which are designed to only access locally-attached storage may be enabled to access networked storage.

15 Claims, 7 Drawing Sheets

SYSTEM AND METHOD FOR MAPPING BLOCK-BASED FILE OPERATIONS TO FILE LEVEL PROTOCOLS

FIELD OF THE INVENTION

This invention relates to network storage systems and, more particularly to accessing networked storage systems.

BACKGROUND OF THE INVENTION

Data communication in a computer network involves the exchange of data between two or more entities interconnected by communication links. These entities are typically software programs executing on hardware computer systems that include locally attached storage devices. Depending on their roles within the network, these computer systems may serve as intermediate network nodes or end nodes. Examples of end nodes may include client and server systems coupled to a communication link, such as a point-to-point link, shared local area network, wide area network or virtual private network implemented over a public network, such as the Internet.

A server is a computer configured to provide specific services; when operating according to a client/server model of information delivery, the server may be configured to allow many clients to access its services. In this model, the client may comprise an application executing on an operating system that "connects" to the server over the computer network. Each client may request the services of the server by issuing protocol messages (in the form of packets) to the server over the network. The server then responds to the client request by returning the requested services in the form of packets transported over the network.

A filer is a server configured to provide file service relating to the organization of information on storage devices, such as disks. The filer may be embodied as a storage system including a storage operating system that implements a file system to logically organize the information as a hierarchical structure of directories and files on the disks. Each "on-disk" file may be implemented as a set of disk blocks configured to store information, such as data, whereas the directory may be implemented as a specially formatted file in which information about other files and directories are stored.

An example of an application running on a client is the Microsoft® Exchange application available from Microsoft Corporation, Redmond, Wash. Microsoft Exchange is a messaging and collaboration software product that provides a variety of applications for group interaction using networked computer systems. An Exchange application can run on a variety of operating systems including, for example, the Microsoft Windows® NT™ or Microsoft Windows 2000 operating system. The Microsoft NT operating system is described in *Inside Windows NT* by Helen Custer, Microsoft Press, 1993.

A file system designed for use with the NT or Windows 2000 operating system is the NT file system (NTFS). In NTFS, each unit of information associated with a file, including its name, its owner, its time stamps and its data contents, is implemented as a file attribute. Both files and directories have attributes, wherein each attribute consists of a single stream or sequence of bytes. This implementation facilitates the addition of more attributes, including data content attributes, to a file. The NTFS file system is well known and described in *Inside the Windows NT File System* by Helen Custer, Microsoft Press, 1994.

The conventional Small Computer System Interface (SCSI) protocol is a block access protocol configured to access storage devices (disks). Many computer systems use the SCSI protocol to access data on storage devices locally attached to the systems. Many systems also support facilities adapted to access network attached storage through file access protocols, such as the Network File System (NFS) and Common Internet File System (CIFS) protocols. Applications running on a client system can access files contained on either locally attached or network attached storage.

There are differences, however, in the interpretation of data that is exchanged using block access protocols compared to file access protocols. A block access protocol, such as the SCSI protocol, "assumes" that the storage device is composed of a sequence of blocks, each containing either data or available space for storing data. Requests for retrieving (reading) or storing (writing) data contain references for block numbers and data lengths. As a result, an application issuing a SCSI request (i.e., a SCSI requester) must have knowledge of the meta-data mapping between the desired data and the physical location of that data on the storage device.

In contrast, file access protocols assume that the server contains a file system on which file data is stored. The file system generally refers to structuring of data and metadata on storage devices, such as disks, which permits reading/writing of data on those disks. The file system also includes mechanisms for performing these operations. While different file access protocols provide different semantics, each protocol fundamentally provides access to file system constructs, such as directories and files. The file server is responsible for mapping the files to its storage system.

A filer generally provides higher data capacity, data storage speed and data access speed than disks locally attached to a client. It is therefore often desirable for a client system to utilize a filer for networked data storage. However, some applications running on a client are unable to utilize networked data storage because the file system operations provided by the file access protocol may not fully match the operations provided by the file system residing on the client. For example, some operations that are available on the NTFS file system used with the Windows 2000 operating system are not available over the CIFS protocol.

As a result, an application, such as Exchange, that is running on the client can only write data to, and read data from, locally attached storage devices using a block access protocol, such as the SCSI protocol. The application must query the type of storage device using, e.g., a Win32 application programming interface (API), and decide whether it can use that device. This prevents use of the CIFS protocol for some classes of applications. The advantages of data storage on a file server, including data integrity and backup services implemented on the file server, are thus not available to the application.

SUMMARY OF THE INVENTION

The disadvantages of the prior art are overcome by providing a system and method for mapping block access protocol operations supported by a storage system locally attached to a computer to file access protocol operations supported by a network attached storage system. A data access protocol software driver of the computer includes a mapping function that maps a unit of storage on the network attached storage system to a virtual logical disk (VLD) of the locally attached storage system. The novel driver further includes a protocol translation function that translates block access operations or requests directed to the VLD into file access requests directed to the network attached storage system. This arrangement advantageously enables applications adapted to access data stored only on disks of a locally attached storage system to access data of network attached storage on a filer.

In the illustrative embodiment, the computer is a client with a local file system, such as NTFS, that does not fully support operations provided by a file access protocol, such as the CIFS protocol, used to access data stored on the network attached storage system. Accordingly, an application executing on the client accesses data of the locally attached storage system using a block access protocol, such as the SCSI protocol. The network attached storage system is embodied as a filer and the unit of storage on the filer is a file. The VLD functions as a data container for storing the file as a logical representation of a disk in the storage system locally attached to the client.

When the NTFS file system of the client issues a block access request to access data, the data access protocol driver determines whether the request is directed to a disk of the locally attached storage system or to the VLD. If the request is directed to the locally attached storage system, then the data access protocol driver forwards the requested block access operation onto the appropriate disk. Otherwise, the block access protocol driver maps the block access request to a file access request and forwards that request to the filer using a file access protocol, such as NFS. In response, the filer performs the requested operation and returns the results to the client using the file access protocol. The data access protocol driver file then maps the file access response to a block access response.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN
ILLUSTRATIVE EMBODIMENT

A. Network Environment

Figure 1:
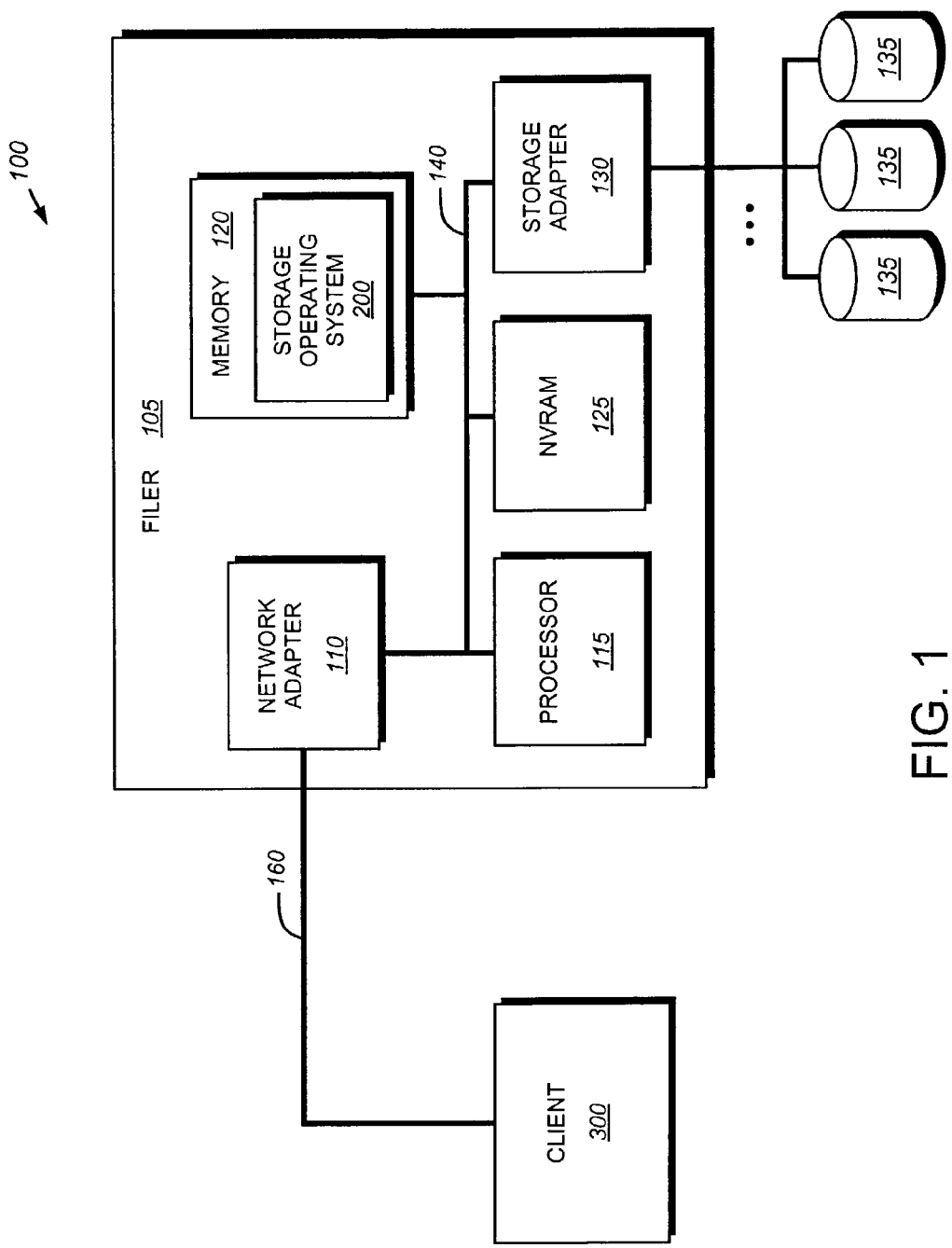
FIG. 1, already described, is a schematic block diagram of an exemplary server environment having locally-attached storage devices.

FIG. 1 is a schematic block diagram of a computer network 100 including a client 300 and a file server 105 that may be advantageously used with the present invention. The filer server or "filer" 105 is a computer that provides file service relating to the organization of information on storage devices, such as disks 135. It will be understood to those skilled in the art that the inventive technique described herein may apply to any type of special-purpose computer (e.g., server) or general-purpose computer, including a standalone computer. The filer 105 comprises a processor 115, a memory 120, a network adapter 110 and a storage adapter 130 interconnected by a system bus 140. The filer also includes a storage operating system 200 (see generally FIG. 2) that implements a file system to logically organize the information as a hierarchical structure of directories and files on the disks. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 120 comprises storage locations that are addressable by the processor and adapters for storing software program code. The memory comprises a form of random access memory (RAM) that is generally cleared by a power cycle or other reboot operation (e.g., it is a "volatile" memory). The processor and adapters may, in turn, comprise processing elements and/or logic circuitry configured to execute the software code and manipulate the data structures. The storage operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 110 comprises the mechanical, electrical and signaling circuitry needed to connect the filer 105 to client 300 over the network 160 which may comprise a point-to-point connection or a shared medium, such as a local area network. Moreover, the client 300 may interact with the filer 105 in accordance with a client/server model of information delivery. That is, the client may request the services of the filer, and the filer may return the results of the services requested by the client by exchanging packets encapsulating, e.g., the NFS protocol format over the network 160.

The storage adapter 130 cooperates with the operating system 200 executing on the filer to access information requested by the client. The information may be stored on the disks 135 that are attached to the filer 105 or other nodes of a storage system as defined herein. The storage adapter 130 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 115 (or the adapter 130 itself) prior to being forwarded over the system bus 140 to the network adapter 110, where the information is formatted into a packet and returned to the client 300.

In one exemplary filer implementation, the filer 105 can include a nonvolatile random access memory (NVRAM) 125 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

In an illustrative embodiment, the disks 135 are arranged into a plurality of volumes, each having a file system associated therewith. Each volume includes one or more disks 135. In one embodiment, the physical disks 135 are configured into RAID groups so that some disks store striped data and some disks store separate parity for the data, in accordance with an illustrative RAID 4 configuration. Of course, other configurations (e.g. RAID 5 having distributed parity across the disks) are also contemplated. In this embodiment, a minimum of one parity disk and one data disk is employed. However, a typical implementation may include three data and one parity disk per RAID group, and a multiplicity of RAID groups per volume.

B. Storage Operating System

To facilitate generalized access to the disks 135, the storage operating system 200 implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. In the illustrative embodiment described herein, the storage operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

As used herein, the term "storage operating system" generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
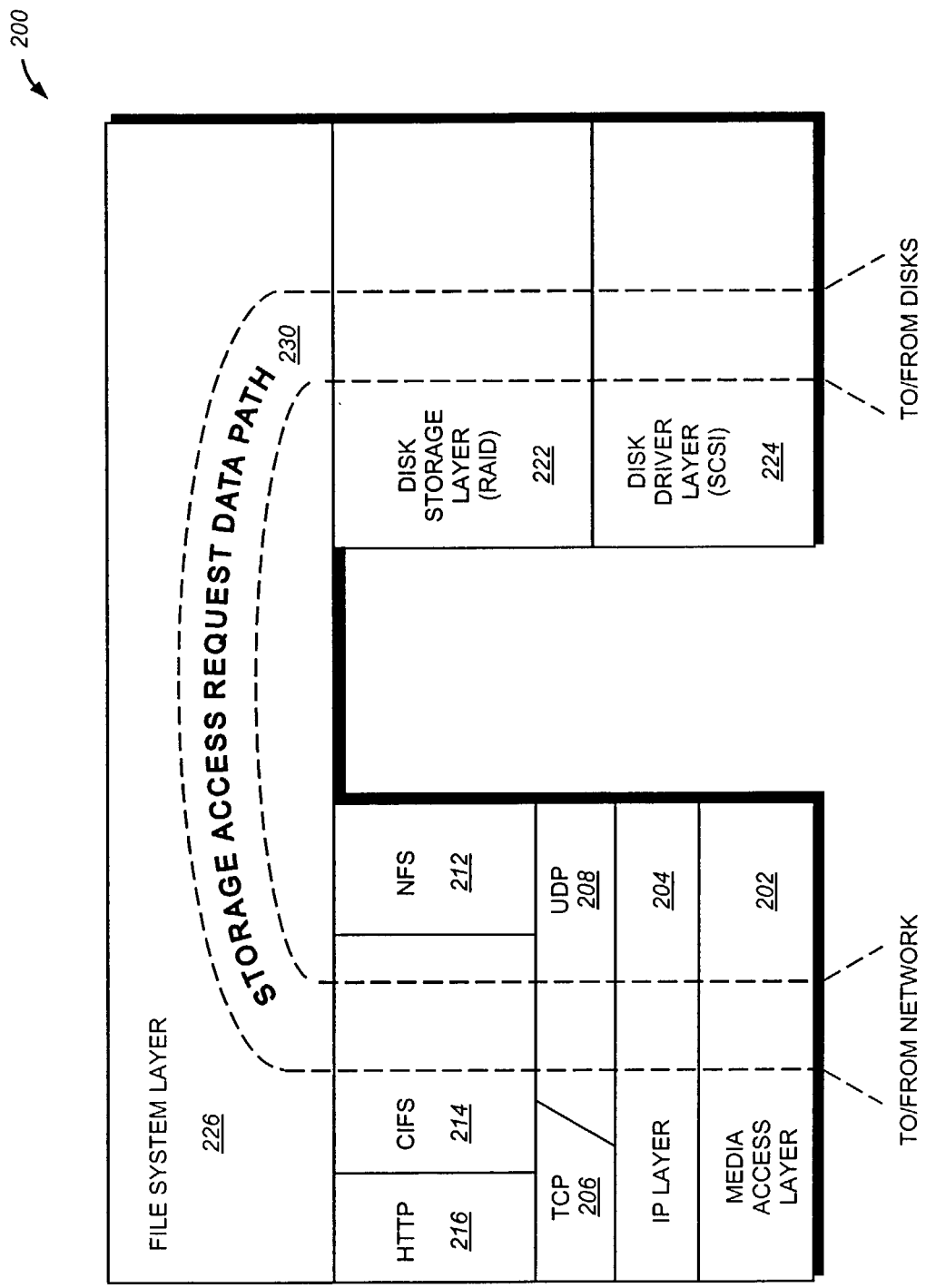
FIG. 2 is a schematic block diagram of a networking environment having servers and file servers in accordance with an embodiment of the present invention.

The organization of the preferred storage operating system for the exemplary filer is now described briefly. However, it is expressly contemplated that the principles of this invention can be implemented using a variety of alternate storage operating system architectures. As shown in FIG. 2, the storage operating system 200 comprises a series of software layers, including a media access layer 202 of network drivers (e.g., an Ethernet driver). The operating system further includes network protocol layers, such as the Internet Protocol (IP) layer 204 and its supporting transport mechanisms, the Transport Control Protocol (TCP) layer 206 and the User Datagram Protocol (UDP) layer 208. A file system protocol layer provides multi-protocol data access and, to that end, includes support for the Common Internet File System (CIFS) protocol 214, the Network File System (NFS) protocol 212 and the Hypertext Transfer Protocol (HTTP) protocol 216. In addition, the storage operating system 200 includes a disk storage layer 222 that implements a disk storage protocol, such as a RAID protocol, and a disk driver layer 224, that implements a disk control protocol such as the small computer system interface (SCSI).

Bridging the disk software layers with the network and file system protocol layers is a file system layer 226 of the storage operating system 200. Generally, the layer 226 implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer's memory 120. If the information is not in memory, the file system layer 226 indexes into an inode file using an inode number to access an appropriate entry and retrieve a logical volume block number. The file system layer 226 then passes the logical volume block number to the disk storage (RAID) layer 222, which maps that logical number to a disk block number and sends the latter to an appropriate driver (for example, an encapsulation of SCSI implemented on a Fibre Channel disk interconnection) of the disk driver layer 224. The disk driver accesses the disk block number from volumes and loads the requested data in memory 120 for processing by the filer 105. Upon completion of the request, the filer (and storage operating system) returns a reply.

It should be noted that the software "path" 230 through the storage operating system layers described above needed to perform data storage access for the client request received at the filer may alternatively be implemented in hardware or a combination of hardware and software. That is, in an alternate embodiment of the invention, the storage access request data path 230 may be implemented as logic circuitry embodied within a field programmable gate array (FPGA) or an application specific integrated circuit (ASIC). This type of hardware implementation increases the performance of the file service provided by filer 105 in response to file system requests

C. Client

Figure 3:
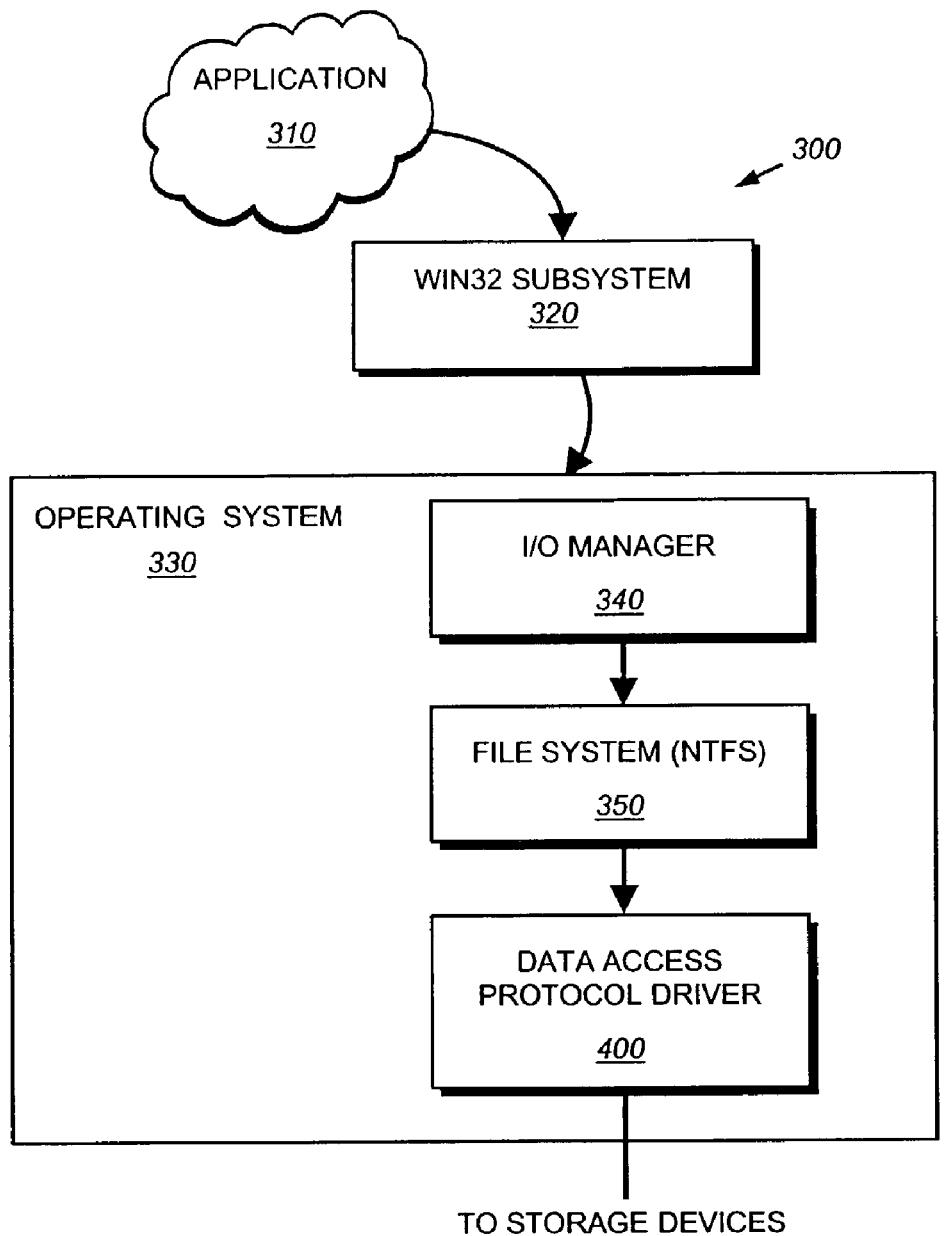
FIG. 3 is a schematic block diagram of an exemplary storage operating system for use on the file server of FIG. 2 in accordance with an embodiment of this invention.

FIG. 3 is a schematic block diagram of client 300 including an application 310 running on an operating system 330. An example of an application and an operating system that may be advantageously used with the present invention are the Microsoft Exchange application and Microsoft Windows® NT™ or Microsoft Windows 2000 operating system available from Microsoft Corporation. A Win 32 subsystem 320 makes Windows application programming interfaces (APIs) available to application programs, such as application 310, to access operating system 300.

The operating system 300 comprises, inter alia, an I/O manager 310 that implements device-independent I/O facilities. The I/O manager further allows device drivers and file systems (which are also viewed as "device drivers") to be dynamically loaded into and out of the operating system. These drivers are modular and "layered" to allow different file systems to call, e.g., the same disk driver to access files. An example of a disk driver is a SCSI driver adapted to access data stored in files on storage devices, such as the disks (not shown) of a locally attached storage system.

A file system designed for use with operating system 300 is the NT file system (NTFS) 350. In NTFS, each unit of information associated with a file, including its name, its owner, its time stamps and its data contents, is implemented as a file attribute. Both files and directories have attributes, wherein each attribute consists of a single stream or sequence of bytes. This implementation facilitates the addition of more attributes, including data content attributes, to a file.

An application, such as Microsoft Exchange, running on the client 300 may be unable to utilize networked data storage because file system operations provided by a file access protocol may not fully match the operations provided by the file system 350 residing on the client. For example, some operations that are available on the NTFS file system used with the Windows 2000 operating system are not available over the CIFS protocol. As a result, the application can only write data to, and read data from, locally attached storage devices of storage system using a block access protocol, such as the SCSI protocol. The application must query the type of storage device using, e.g., a Win32 API of subsystem 320, and decide whether it can use that device. This prevents use of the CIFS protocol for some classes of applications.

Figure 4:
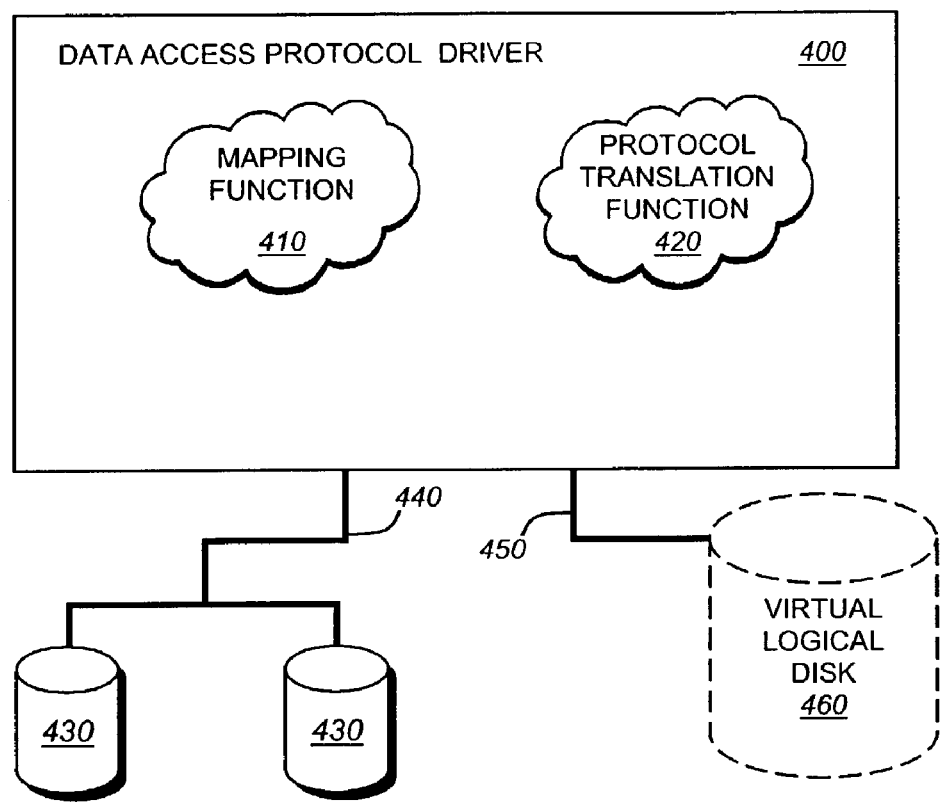
FIG. 4 is a schematic block diagram of a data access protocol driver in accordance with an embodiment of the present invention.

The present invention is directed to a system and method for mapping block access protocol operations supported by the locally attached storage system to file access protocol operations supported by a network attached storage system, such as filer 105 (FIG. 1). FIG. 4 is a schematic block diagram of a data access protocol driver 400 in accordance with an embodiment of this invention. The data access protocol driver 400 includes a mapping function 410 and a protocol translation function 420.

The mapping function 410 maps a unit of storage on a filer 105 to a virtual logical disk (VLD) 460 of a locally attached storage system. Thus, the mapping function causes the VLD, which is embodied as a file stored on the filer, to appear as a locally attached device to the client 300. The novel driver 400 also includes a protocol translation function 420 that translates block access operations or requests directed to the VLD 460 into file access requests directed to the network attached storage, i.e. the filer. The unit of storage on the filer is a file and the VLD 460 functions as a data container for storing the file as a logical representation of a disk in the storage system attached to the client 300.

In the illustrative embodiment, the VLD stores data accordingly to the file system semantics of the client. Thus, in the example above, the VLD would store data using NTFS. Notably, these files are sized up to the storage size of the virtual logical disk, for example tens of gigabytes. The files stored on the file server illustratively utilize a set naming convention. For example, these files are named "XXXX.VLD" where XXXX is a unique identifier associated with the client which created the virtual logical disk. It is expressly contemplated that other naming conventions can be utilized with the present invention and as such the naming convention described herein is exemplary only.

Broadly stated, when the file system 350 of the client 300 issues a block access request to access data, the data access protocol driver 400 determines whether the request is directed to a physical disk 430 or to a VLD 460. If the request is directed to a disk 430, then the data access protocol driver 400 forwards the requested block access operation onto that disk. In these instances, the data access protocol driver functions similar to a traditional block-based protocol driver, e.g., a SCSI driver. Otherwise, the block access protocol driver 400 maps the block access request to a file access request and forwards that request to the filer 105 using a file access protocol, such as NFS. In response, the filer 105 performs the requested operation to the file and returns the results to the client 300 using the file access protocol. The data access protocol driver 400 then maps the file access response to a block access response and returns that response to the file system 350.

D. Block-Based to File-Based Protocol Mapping

Figure 5:
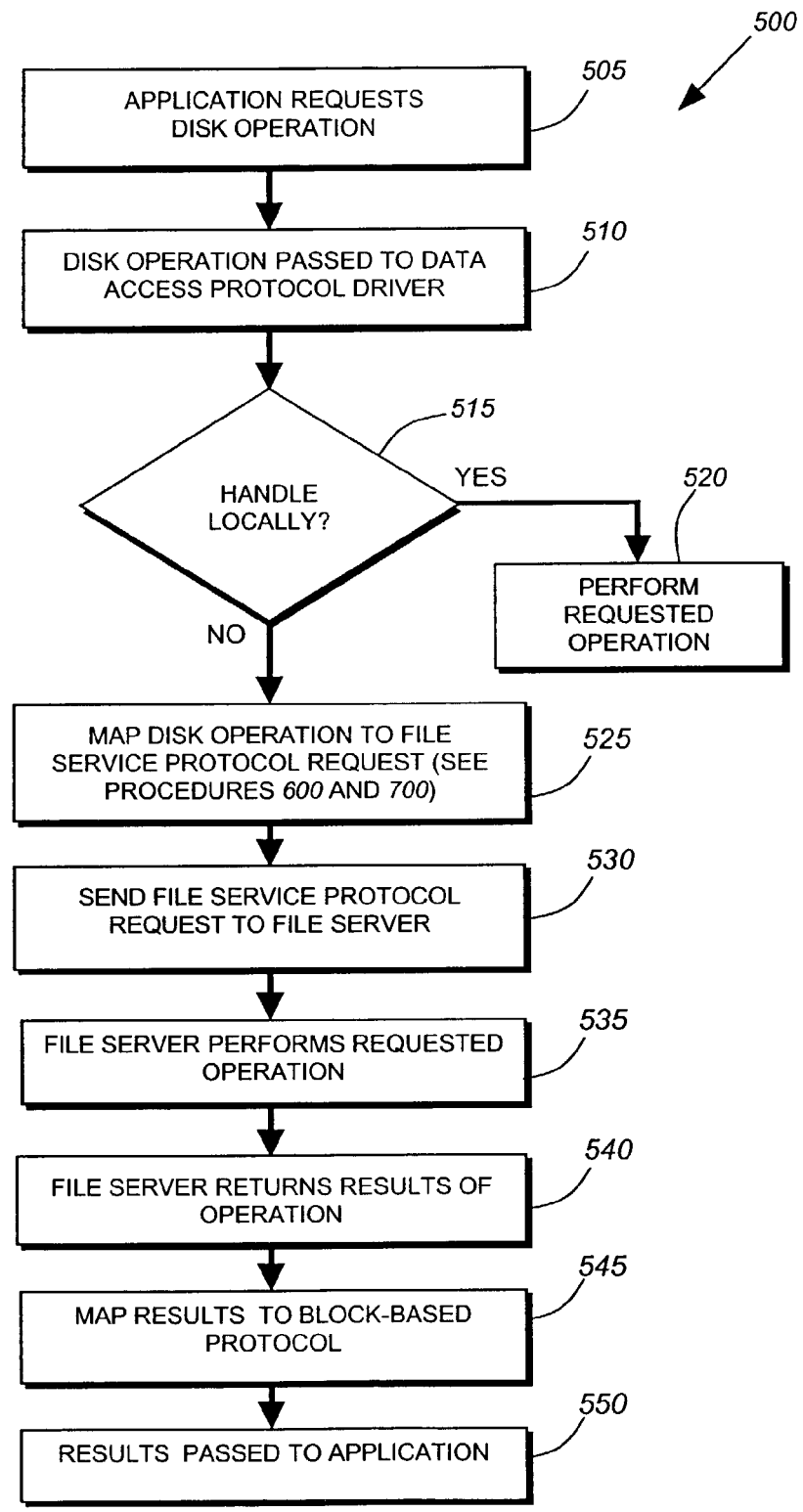
FIG. 5 is a flowchart detailing the steps in the procedure for performing disk operations using a modified block-based protocol driver in accordance with an embodiment of this invention.

A flow chart of the steps of the procedure 500 performed by the novel data access protocol driver in response to receiving an I/O operation is shown in FIG. 5. Initially, in step 505, an application executing on the computer requests a disk operation. This disk operation is then, in step 510, passed to the data access protocol driver. This can be accomplished using known application program interfaces (APIs) or other operating system procedures. The data access protocol driver then determines, in step 515, if the disk operation is to be performed on local disks. By "local disks" it is meant disks that are physically connected to the computer and are not accessed through a file server. If the requested disk operation is to be performed on a local disk, then the data access protocol driver performs the requested operation to the designated local disk in step 520.

If the request is not to be performed on a local disk, then the protocol translation function of the data access protocol driver maps the requested disk operation to the appropriate file service protocol request in step 525. This mapping, described further below, generates an appropriately formatted request in the selected file service protocol. The file service protocol request is then sent to the appropriate file server (step 530) using known networking techniques. As known file service protocols are utilized, this request can be sent using the same network interface controller (NIC) that the client utilizes for other networking operations. In step 535, the file server performs the requested operation. After the file server performs the requested operation, then the file server returns the results of the operation in step 540. The results may include, for example, acknowledgment that a write operation was successful, or, if the requested operation was a read operation, the requested data. Once the results of the operation have been received by the server, those results are mapped to the appropriate block-based protocol in step 545. The results are then passed to the requesting application in step 550.

In the illustrative embodiment, the block-based protocol is a SCSI protocol and the file-level protocol is a NFS protocol. However, it is expressly contemplated that other block-based and file-level protocols may be utilized in accordance with the teachings of the present invention. The SCSI READ (10) command is used to request that a storage device transfer data to the requestor. Table 1 shows the format of the SCSI READ

(10) command. Note that the various fields (and associated acronyms describing such fields) of the format are in conformance with various publicly available specifications. The SCSI READ (10) and WRITE (10) commands and the various options are further described in SCSI-3 Block Commands, NCITS 306-199X, by the American National Standards Institute, Inc., which is hereby incorporated by reference.

TABLE 1

SCSI READ (10) Command

| Bit<br>Byte | 7 | 6 | 5 | 4 | 3 | 2 | 1 | 0 |
|---|---|---|---|---|---|---|---|---|
| 0 | Operation Code 0x28 ||||||||
| 1 | Reserved |||| DPO | FUA | Reserved | RELADR |
| 2 | Logical Block Address (MSB) ||||||||
| 3 | Logical Block Address ||||||||
| 4 | Logical Block Address ||||||||
| 5 | Logical Block Address (LSB) ||||||||
| 6 | Reserved ||||||||
| 7 | Transfer Length (MSB) ||||||||
| 8 | Transfer Length (LSB) ||||||||
| 9 | Control ||||||||

The operation code 0x28 identifies the command as the SCSI READ (10) command. The logical block address which is attained in bytes 2-5 of the command, defines the offset in blocks within the storage device from which the read should begin. The transfer length, bytes 7 and 8 of the command, defines the number of continuous blocks that should be read to satisfy this particular request. A disable page out (DPO) is used to control replacement of logical blocks in the cache memory when the client has information regarding the future usage of the logical blocks. If the DPO bit is set to a value of 1, then the host indicates that the logical blocks accessed by the command are not likely to be accessed again in the near future and, therefore, should not be put in the cache memory nor retained by the cache memory.

A force unit access (FUA) bit is used to indicate whether the storage device may satisfy the command by accessing the cache memory. A relative address (RELADR) bit indicates whether the logical block address field specifies the first logical block of a range of logical blocks or whether the logical address field is a two's compliment displacement. If the desired device is a local device then the data access protocol driver locates the block identified by the logical block address and reads the number of blocks identified by the transfer length. However, in accordance with the present invention, the SCSI READ (10) command is mapped to the NFS Read procedure.

Similarly, the NFS Read procedure reads data from a file. The format of the NFS Read procedure is shown in Table 2.

TABLE 2

NFS Read Procedure

| Bit<br>Byte | 7 | 6 | 5 | 4 | 3 | 2 | 1 | 0 |
|---|---|---|---|---|---|---|---|---|
| 0-N | Variable Length File Handle (up to 64 Bytes) ||||||||
| N + 1 | Offset (MSB) ||||||||
| N + 2 | Offset ||||||||
| N + 3 | Offset ||||||||
| N + 4 | Offset ||||||||
| N + 5 | Offset ||||||||
| N + 6 | Offset ||||||||
| N + 7 | Offset ||||||||
| N + 8 | Offset (LSB) ||||||||
| N + 9 | Count (MSB) ||||||||
| N + 10 | Count ||||||||
| N + 11 | Count ||||||||
| N + 12 | Count (LSB) ||||||||

The NFS Read procedure includes a variable length file handle, which is managed by the data access protocol driver that identifies the file to read from. The offset, which is stored in the first eight bytes after the file handle, identifies the starting location for the read operation within the file. Similarly, the count, contained within bytes 9-12, defines the number of contiguous bytes that should read to satisfy the read request.

Figure 6:
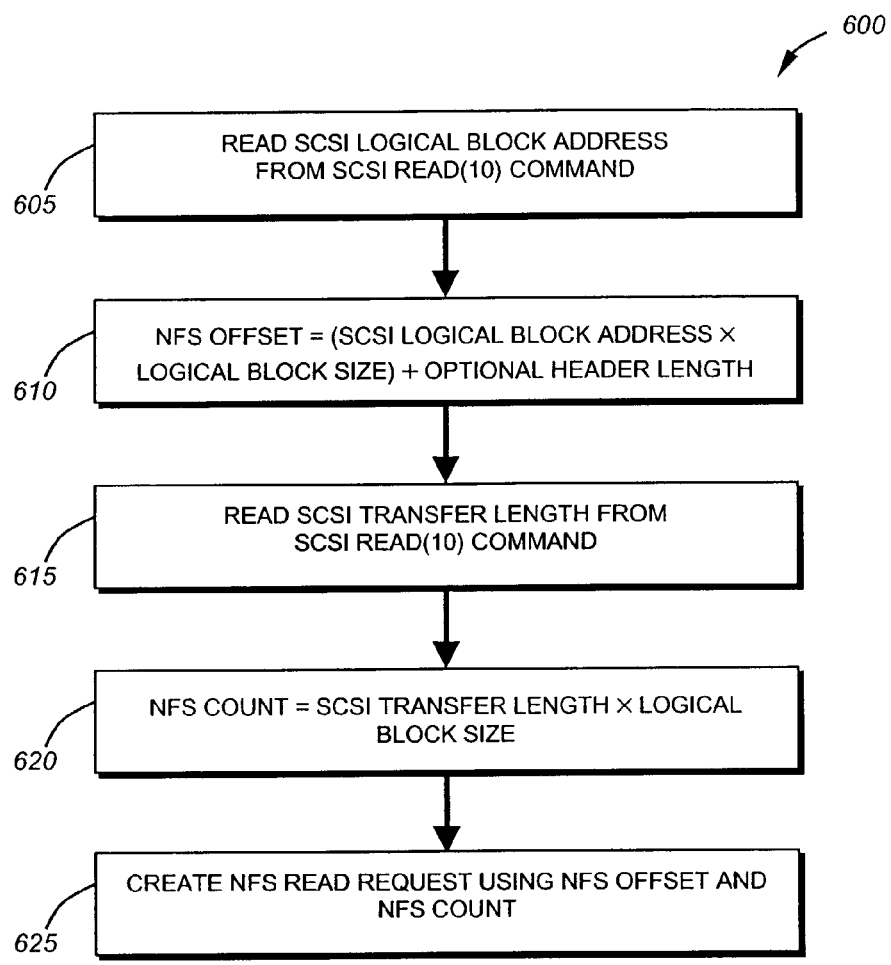
FIG. 6 is a flowchart detailing the steps of a procedure for mapping a SCSI READ (10) command to a NFS Read procedure in accordance with an embodiment of this invention.

The procedure used by the protocol translation function 420 of the data access protocol driver 400 in mapping the SCSI READ (10) command to the NFS Read procedure is shown in FIG. 6. The procedure 600 first reads the SCSI logical block address from the SCSI READ (10) command in step 605. The procedure then, in step 610, computes the NFS offset using the following equation:

NFS offset=(SCSI logical block address×logical block size)+optional header length.

The logical block size is the size of a single logical block in bytes. Differing storage devices can have different logical block sizes, for example a disk could be formatted for 512 or 1024 bytes per block. The NFS offset must be computed by multiplying the SCSI logical block address by the logical block size because the NFS procedure uses bytes as the unit of data, while SCSI utilizes blocks as its unit of data. The optional header may be used to store metadata associated with the logical disk. An example of such metadata would include, security keys or drive signatures. The use of the header is optional.

Next, in step 615, the procedure reads the SCSI transfer length from the SCSI read (10) command. The procedure then computes the NFS count in step 620. The NFS count is the length of data that can be read in bytes. The NFS count is computed by multiplying the SCSI transfer length times the logical block size. Finally, in step 625, the procedure creates a NFS read request using the computed NFS offset and NFS count.

During write procedures, the SCSI WRITE (10) command stores data on a storage device. The format of the SCSI WRITE (10) command is shown in Table 3.

TABLE 3

SCSI WRITE (10) Command

| Bit<br>Byte | 7 | 6 | 5 | 4 | 3 | 2 | 1 | 0 |
|---|---|---|---|---|---|---|---|---|
| 0 | Operation Code 0x2A ||||||||
| 1 | Reserved |||  DPO | FUA | Reserved | RELADR |
| 2 | Logical Block Address ||||||||
| 3 | Logical Block Address ||||||||
| 4 | Logical Block Address ||||||||
| 5 | Logical Block Address (LSB) ||||||||
| 6 | Reserved ||||||||
| 7 | Transfer Length (MSB) ||||||||
| 8 | Transfer Length (LSB) ||||||||
| 9 | Control ||||||||

Similar to the SCSI READ (10) command, the SCSI WRITE (10) command includes an operation code which defines the write procedure. The SCSI write procedure also includes a logical block address defining the offset in blocks within the storage device to which the write should begin and a transfer length that defines the number of contiguous blocks that should be written to satisfy the write request. The NFS Write procedure performs write operations to a file using NFS. The format of the NFS Write procedure is shown in Table 4.

TABLE 4

NFS Write Procedure

| Bit<br>Byte | 7 | 6 | 5 | 4 | 3 | 2 | 1 | 0 |
|---|---|---|---|---|---|---|---|---|
| 0-N | Variable Length File Handle (up to 64 Bytes) ||||||||
| N + 1 | Offset (MSB) ||||||||
| N + 2 | Offset ||||||||
| N + 3 | Offset ||||||||
| N + 4 | Offset ||||||||
| N + 5 | Offset ||||||||
| N + 6 | Offset ||||||||
| N + 7 | Offset ||||||||
| N + 8 | Offset (LSB) ||||||||
| N + 9 | Count (MSB) ||||||||
| N + 10 | Count ||||||||
| N + 11 | Count ||||||||
| N + 12 | Count (LSB) ||||||||
| N + 13 | Stable ||||||||
| N + 14 | Data ||||||||

Figure 7:
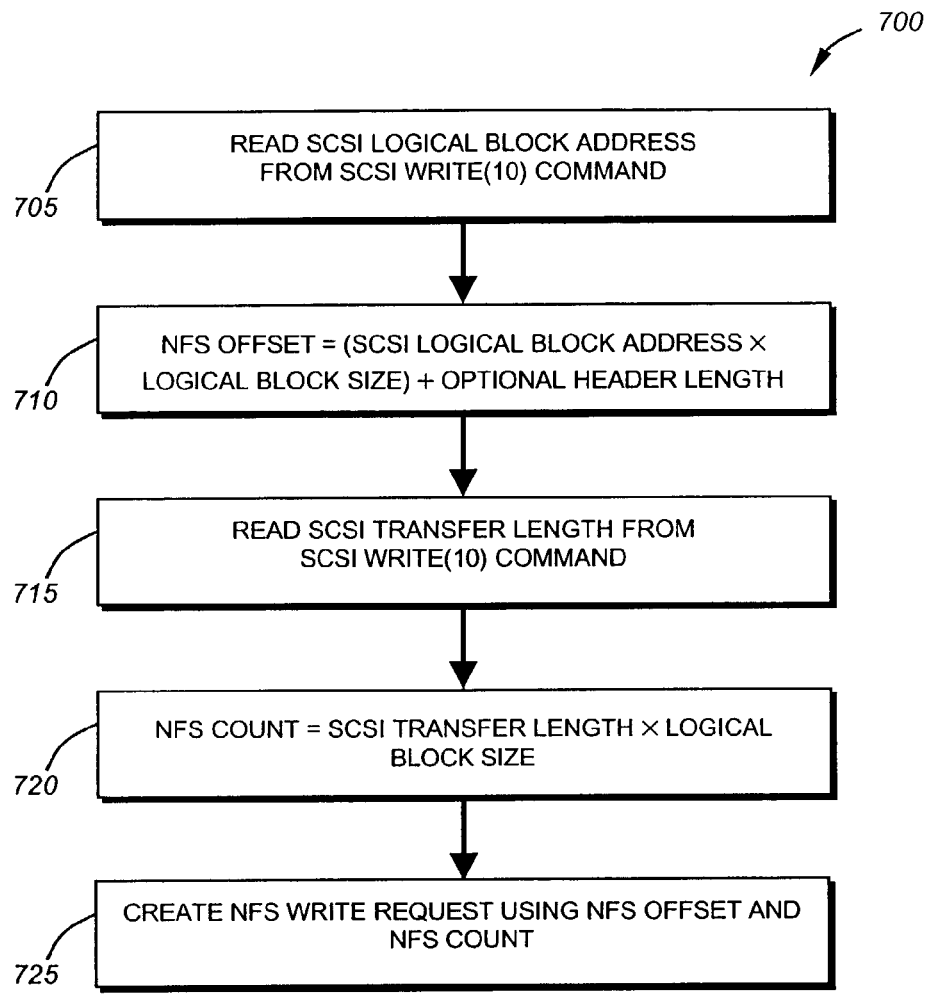
FIG. 7 is a flowchart detailing the steps of a procedure for mapping a SCSI WRITE (10) command to a NFS Write procedure in accordance with an embodiment of the invention.

The procedure 700 performed by the protocol translation function 420 of the data access protocol driver in mapping a SCSI WRITE command to a NFS Write command is shown in FIG. 7. Initially, in step 705, the procedure reads the SCSI logical block address from the SCSI WRITE (10) command. The procedure then, in step 710, computes the NFS offset by utilizing the following equation:

NFS offset=(SCSI logical block address×logical block size)+optional header length.

This NFS offset is computed as the SCSI WRITE (10) command uses blocks as its unit of measurement, while the NFS write command utilizes bytes. The NFS offset identifies the location within the file where the write should begin. Next, in step 715, the procedure reads the SCSI transfer length from the SCSI WRITE (10) command. Next, in step 720, the NFS count is computed by multiplying the SCSI transfer length by the logical block size. After the NFS count has been computed, the procedure creates an NFS write request using the NFS offset and the NFS count that was previously computed (step 725).

To again summarize, a data access protocol driver includes a protocol translation function that maps block-based protocol commands to a file-level protocol for access in a virtual logical disk. This mapping enables applications that are not designed to use file-level protocols to utilize the storage capabilities of file servers or other networked storage systems. This mapping further allows the driver to emulate a block-based storage device. Applications that are capable of performing data access operations (i.e. input/output operations) to locally attached storage devices can perform the data access operations to the driver, which then maps the requested operations to the file-level protocol and forwards it to the appropriate file server. The mapping is done transparently to applications executing on the computer.

An application utilizing the novel data access protocol driver uses standard block-based commands in performing data access operations. When the data access protocol driver receives a block-based protocol command directed to a VLD, the protocol translation function of the driver maps the command to a file-level protocol and forwards the file-level protocol command to the appropriate networked storage device system. The storage performs the requested operation and sends a response to the client, where the data access protocol driver maps the file level response to an appropriate block-based format and forwards the response to the application.

The foregoing has been a detailed description of the illustrative embodiment of the invention. Various modifications and additions can be made without departing from the spirit and scope of the invention. While this description has been written with reference to the SCSI and NFS protocols, it should be noted that the principles of the invention apply to any block-based and/or file-level protocol including, but not limited to, the Common Internet File System (CIFS), the Direct Access File System (DAFS), and the Hyper Text Transport Protocol (HTTP). This description has been written in terms of a software data access protocol driver, however it is expressly contemplated that the teachings of this invention can be implemented as software, including a computer-readable medium having program instructions executing on a computer, hardware, firmware, or a combination thereof. Accordingly, this description should be taken only by way of example and not to otherwise limit the scope of the invention.

What is claimed is:

1. A computer implemented method for performing data access operations to a file accessible by a file level protocol, the method comprising:

receiving, by a data access protocol module of a client, a Small Computer System Interface (SCSI) block based read command;

reading a SCSI logical block address from the SCSI read command;

computing a Network File System (NFS) offset from the SCSI logical block address;

creating a NFS read request using the NFS offset;

forwarding the NFS read request to a server;

reading, by the server, NFS file data from a data storage device connected to the server in response to the NFS read request;

forwarding, by the server, a NFS response to the client, wherein the response includes the NFS file data; and translating, by the data access protocol module of the client the NFS response into a SCSI block based response.

2. The method of claim 1, wherein the step of calculating the NFS offset further comprises multiplying a logical block address by a logical block size.

3. The method of claim 2 further comprising adding a header length to the calculated offset.

4. The method of claim 1, further comprising:

calculating a length of the SCSI logical block address, wherein the length of the SCSI logical block address is calculated by multiplying a transfer length by a logical block size.

5. The method of claim 1, wherein the client does not support operations in the file level protocol without using the data access protocol module.

6. The method of claim 1, wherein the data access protocol module is a program within an operating system of the client, and the operating system is executed by a processor.

7. The method of claim 1, wherein the data access protocol module is firmware.

8. The method of claim 1, wherein the data access protocol module comprises a mapping function and a protocol translation function.

9. The method of claim 8, wherein the mapping function maps units of storage storing the file on the client to a virtual logical disk stored on the server.

10. The method of claim 9, wherein the protocol translation function translates the SCSI logical block address directed to the virtual logical disk into a file access requests directed to the server.

11. The method of claim 1, wherein the data access protocol module is software executed by a processor.

12. The method of claim 1, wherein the data access protocol module is a driver.

13. A system, comprising:

a client configured with a data access protocol module, the data access protocol module configured to receive a Small Computer System Interface (SCSI) block based read command, to read a SCSI logical block address from the SCSI read command, to compute a Network File System (NFS) offset from the SCSI logical block address, to create a NFS read request using the NFS offset, and to forward the NFS read request to a server; and a server configured to read NFS file data from a data storage device connected to the server in response to the NFS read request and to forward a NFS response to the client, wherein the response includes the NFS file data; and the data access protocol module of the client further configured to translate the NFS response into a SCSI block based response.

14. The system of claim 13, wherein the client does not fully support operations in the file level protocol.

15. A computer readable storage medium containing executable program instructions executed by a processor, comprising:

program instructions that receive, by a data access protocol module of a client, a Small Computer System Interface (SCSI) block based read command;

program instructions that read a SCSI logical block address from the SCSI read command;

program instructions that compute a Network File System (NFS) offset from the SCSI logical block address;

program instructions that create a NFS read request using the NFS offset;

program instructions that forward the NFS read request to a server;

program instructions that read, by the server, NFS file data from a data storage device connected to the server in response to the NFS read request;

program instructions that forward, by the server, a NFS response to the client, wherein the response includes the NFS file data; and program instructions that translate, by the data access protocol module of the client the NFS response into a SCSI block based response.

* * * * *